(12) United States Patent
Colin et al.

(10) Patent No.: US 10,967,460 B2
(45) Date of Patent: Apr. 6, 2021

(54) METHOD FOR MANUFACTURING A PART BY MELTING POWDER, THE POWDER PARTICLES REACHING THE BATH IN A COLD STATE

(71) Applicants: SAFRAN AIRCRAFT ENGINES, Paris (FR); MBDA FRANCE, Le Plessis Robinson (FR)

(72) Inventors: Christophe Colin, Evry (FR); Julie Maisonneuve, Lumbin (FR); Gérard Saussereau, Le Mesnil Saint Denis (FR)

(73) Assignees: SAFRAN AIRCRAFT ENGINES, Paris (FR); MBDA FRANCE, Le Plessis-Robinson ( * ) Notice: Subject to any disclaimer, the term of this patent is extended or adjusted under 35 U.S.C. 154(b) by 70 days.

(21) Appl. No.: 14/648,560

(22) PCT Filed: Nov. 29, 2013

(86) PCT No.: PCT/FR2013/052905
§ 371 (c)(1),
(2) Date: May 29, 2015

(87) PCT Pub. No.: WO2014/083291
PCT Pub. Date: Jun. 5, 2014

(65) Prior Publication Data
US 2015/0298259 A1  Oct. 22, 2015

(30) Foreign Application Priority Data
Nov. 30, 2012 (FR) ...................................... 1203257

(51) Int. Cl.
B23K 26/14  (2014.01)
B22F 3/105  (2006.01)
(Continued)

(52) U.S. Cl.
CPC ........ B23K 26/1464 (2013.01); B22F 3/1055 (2013.01); B28B 1/001 (2013.01);
(Continued)

(58) Field of Classification Search
CPC ............ B23K 26/1464; B23K 26/0009; B23K 26/0036; B23K 26/0045; B23K 26/026;
(Continued)

(56) References Cited

U.S. PATENT DOCUMENTS 4,269,868 A * 5/1981 Livsey .................... B05B 7/228
                                                   427/191
4,927,992 A    5/1990 Whitlow et al.
(Continued)

FOREIGN PATENT DOCUMENTS

CN          101264519 B  *  6/2010
EP           2 292 357 A1     3/2011
(Continued)

OTHER PUBLICATIONS

English translation of CN-101264519-B (Year: 2010).*
(Continued)

*Primary Examiner* — Serkan Akar
*Assistant Examiner* — Chris Q Liu
(74) *Attorney, Agent, or Firm* — Pillsbury Winthrop Shaw Pittman LLP (57) ABSTRACT

A method of fabricating a part includes: a) supplying powder particles; b) melting a first quantity of power with a beam and forming, on a support, a first pool including the melted powder and a portion of the support; c) forming a second pool by melting a second quantity of powder on the support; d) repeating c) to form a first layer; e) heating an $[n]^{th}$ quantity of the powder, and forming an $[n]^{th}$ pool above the first layer; f) heating an $[n+1]^{th}$ quantity of the powder, and forming an $[n+1]^{th}$ pool downstream from the $[n]^{th}$ pool (Continued)

above the first layer; g) repeating f) to form a second layer above the first layer; and h) repeating e) to g) until the part is constructed. The powder particles reaching each pool are at a temperature well below the pool temperature.

12 Claims, 3 Drawing Sheets

(51) Int. Cl.
*B29C 64/153* (2017.01)
*B29C 64/00* (2017.01)
*B28B 1/00* (2006.01)
*B29L 31/00* (2006.01)

(52) U.S. Cl.
CPC ............ *B29C 64/00* (2017.08); *B29C 64/153* (2017.08); *B29L 2031/772* (2013.01); *Y02P 10/295* (2015.11)

(58) Field of Classification Search
CPC .. B23K 26/1411; B23K 26/345; B23K 26/32; B23K 26/34; B23K 26/144; B23K 26/342; B23K 26/032; B23K 26/324; B23K 26/0853; B23K 26/034; B23K 26/0732; B23K 26/0884; B23K 26/123; B23K 26/147; B23K 26/1476; B23K 26/1482; B23K 26/00; B23K 26/03; B23K 26/0344; B23K 26/04; B23K 26/046; B23K 26/048; B23K 26/0622; B23K 26/0643; B23K 26/0736; B23K 26/0738; B23K 26/08; B23K 26/103; B23K 26/12; B23K 26/127; B23K 26/1494; B23K 26/28; B23K 26/702; B22F 3/1055; B22F 3/004; B22F 3/1035; B22F 3/15; B22F 3/003; B22F 3/24; B22F 3/006; B22F 3/105; B28B 1/001; B29C 67/0051; B29C 67/0077; B29C 64/153; B29C 64/40; B29C 64/00; B29C 64/20; B29C 64/141; B29C 64/386; B29C 64/124; B29C 64/135; B29C 64/227; B29C 64/25; B29C 64/268; B29C 64/35; B29C 64/371; B29C 64/393; B29L 2031/772; Y02P 10/295
USPC ..... 219/76.1–76.17, 121.61–121.66, 121.63, 219/121.84, 121.64, 121.65, 121.85, 219/121.47, 121.48, 121.8, 121.82, 76.12, 219/121.15, 121.17, 121.45, 121.5, 219/121.59, 121.83, 136, 137 R, 64, 219/69.17, 76.16; 700/118, 119
See application file for complete search history.

(56) References Cited

U.S. PATENT DOCUMENTS

| | | | |
|---|---|---|---|
| 5,396,333 A * | 3/1995 | Aleshin | B23K 26/1494 219/121.83 |
| 6,391,251 B1 | 5/2002 | Keicher et al. | |
| 6,656,409 B1 * | 12/2003 | Keicher | B23P 15/246 219/121.66 |
| 2006/0003095 A1* | 1/2006 | Bullen | B22F 3/004 427/180 |
| 2007/0205184 A1* | 9/2007 | Mazumder | B23H 9/00 219/69.17 |
| 2012/0237745 A1* | 9/2012 | Dierkes | A61K 6/0215 428/215 |

FOREIGN PATENT DOCUMENTS

| | | | | |
|---|---|---|---|---|
| GB | 2 228 224 A | | 8/1990 | |
| GB | 2228224 A | * | 8/1990 | ............ B22F 3/1055 |
| JP | 2007-301980 A | | 11/2007 | |
| RU | 2031764 C1 | | 3/1995 | |
| RU | 2450891 C1 | | 5/2012 | |

OTHER PUBLICATIONS

International Search Report as issued in International Patent Application No. PCT/FR2013/052905, dated Mar. 24, 2014.
Office Action as issued in Russian Patent Application No. RU2015125712, dated Oct. 23, 2017.
Notice of Reasons for Rejection as issued in Japanese Patent Application No. 2015-544522, dated Dec. 19, 2017.
Communication as issued in European Patent Application No. 13808135.1, dated May 15, 2018.
Zhu, G., et al., "The influence of laser and powder defocusing characteristics on the surface quality in laser direct metal deposition," Optics & Laser Technology, vol. 44, No. 2, Jul. 2011, XP028391434, pp. 349-356.
Communication as issued in European Patent Application No. 13808135.1, dated Mar. 27, 2019.
Yu, J., et al., "Mechanics and energy analysis on molten pool spreading during laser solid forming," Applied Surface Science, vol. 256, No. 14, Feb. 2010, XP055571301, pp. 4612-4620.
Mozaffari, A., et al., "Optimal design of laser solid freeform fabrication system and real-time prediction of melt pool geometry using intelligent evolutionary algorithms," Applied Soft Computing, Elsevier, vol. 13, No. 3, Jul. 2012, XP028577840, pp. 1505-1519.
Office Action as issued in Canadian Patent Application No. 2,892,848, dated Nov. 20, 2019.

* cited by examiner

METHOD FOR MANUFACTURING A PART BY MELTING POWDER, THE POWDER PARTICLES REACHING THE BATH IN A COLD STATE

CROSS REFERENCE TO RELATED APPLICATIONS

This application is the U.S. National Stage of PCT/FR2013/052905 filed Nov. 29, 2013, which in turn claims priority to French Application No. 1203257, filed Nov. 30, 2012. The contents of both applications are incorporated herein by reference in their entirety.

The present invention relates to the field of fabricating parts by melting powder by means of a high energy beam (laser beam, electron beam, . . . ).

The invention relates more particularly to a method comprising the following steps:

a) supplying a material in the form of powder particles forming a powder beam;

b) heating a first quantity of the powder to a temperature higher than the melting temperature $T_F$ of the powder with the help of a high energy beam, and forming, at the surface of a support, a first pool comprising this melted powder and a portion of the support;

c) heating a second quantity of the powder to a temperature higher than its melting temperature $T_F$ with the help of the high energy beam, and forming, at the surface of the support, a second pool comprising this melted powder and a portion of the support downstream from the first pool;

d) repeating step c) until a first layer of the part is formed on the support;

e) heating an $[n]^{th}$ quantity of the powder to a temperature higher than its melting temperature $T_F$ with the help of a high energy beam, and forming an $[n]^{th}$ pool comprising in part this melted powder above a portion of the first layer;

f) heating an $[n+1]^{th}$ quantity of the powder to a temperature higher than its melting temperature $T_F$ with the help of the high energy beam, and forming an $[n+1]^{th}$ pool comprising in part this melted powder downstream from said $[n]^{th}$ pool above a portion of said first layer;

g) repeating step f) so as to form a second layer of the part above said first layer; and h) repeating steps e) to g) for each layer situated above an already-formed layer until the part is substantially in its final shape.

In the above method, $[n-1]$ quantities of powder are needed to form the first layer.

Methods are known that make it possible to obtain mechanical parts that are of complex three-dimensional (3D) shape. Those methods build up a part layer by layer until the shape desired for the part has been reconstituted. Advantageously, the part may be reconstituted directly from a computer-aided design and manufacturing (CADM) file deduced from processing the data of a 3D computer assisted design (CAD) graphics file, with a computer controlling the machine that thus forms successive layers of material that is melted and then solidified, one layer on another, with each layer being constituted by juxtaposed fillets of size and shape defined from the CADM file.

By way of example, the particles constituting the powder may be metallic, intermetallic, ceramic, or polymeric.

In the present application, when the powder is a metal alloy, the melting temperature $T_F$ is a temperature lying between the liquidus temperature and the solidus temperature for the given composition of the alloy.

The build support may be a portion of some other part on which it is desired to add an additional function. Its composition may be different from that of the projected powder particles, and it may thus have a different melting temperature.

These methods include in particular projection by laser or "direct metal deposition" (DMD), "selective layer melting" (SLM), and "electron beam melting" (EBM).

Figure 2:
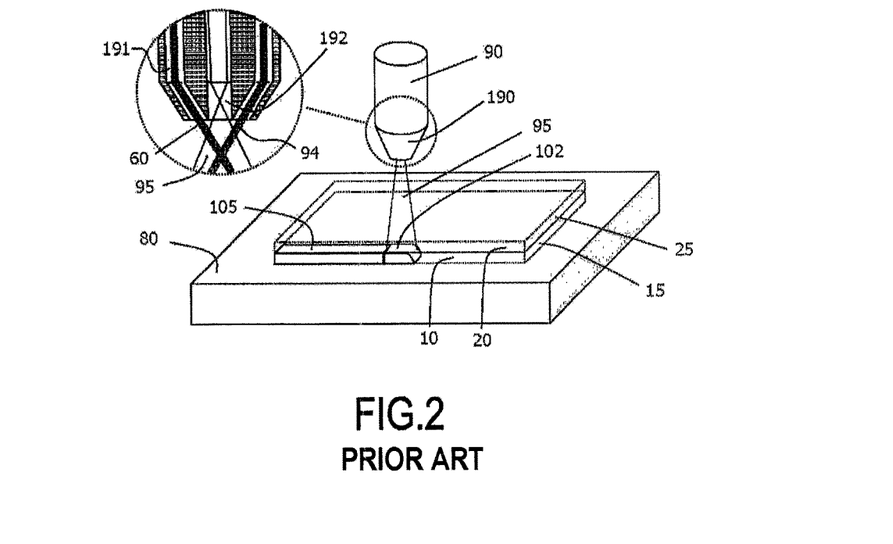
FIG. 2, described above, is a diagram for explaining the prior art method and shows the device for the DMD method.

The operation of the DMD method is explained below with reference to FIGS. 2, 4, and 5.

A first layer 10 of material is formed, under local protection or within an enclosure at a regulated high or low pressure of inert gas, by projecting powder particles through a nozzle 190 onto the material on a support 80. Simultaneously with projecting particles 60 of powder, the nozzle 190 emits a laser beam 95 coming from a generator 90. The first orifice 191 of the nozzle 190 through which the powder is projected onto the support 80 is coaxial around the second orifice 192 through which the laser beam 95 is emitted, such that the powder is projected into the laser beam 95. The powder forms a cone of particles, the cone being hollow and presenting a certain thickness (powder beam 94 in FIG. 4), and the laser beam 95 is conical.

The working plane P is defined as being the plane containing the surface on which the layer is being built and/or formed.

In order to build the first layer, this surface is the top (free) face $S_0$ of the support 80. In order to build the $[n+1]^{th}$ layer, this surface is the top (free) face of the $[n]^{th}$ layer (with integer $\underline{n}$, $n \geq 1$).

The laser beam 95 forms a pool 102 on the support 80 by melting the region of the support 80 that is exposed to the laser beam. The powder feeds the pool 102 in which it arrives already in the molten state, the powder being melted on its path in the laser beam prior to reaching the pool.

Alternatively, and by way of example, the nozzle 190 and the focal point of the laser may be adjusted and/or positioned in such a manner that the powder of given size distribution does not pass sufficient time in the laser beam 95 for all of its particles of different sizes to melt completely, so that they melt on reaching the pool 102 that has previously been formed on the surface of the support 80 by melting the region of the support 80 that is exposed to the laser beam 95.

The working distance WD is defined as being the distance between the nozzle 190 and the working plane P.

Figure 3:
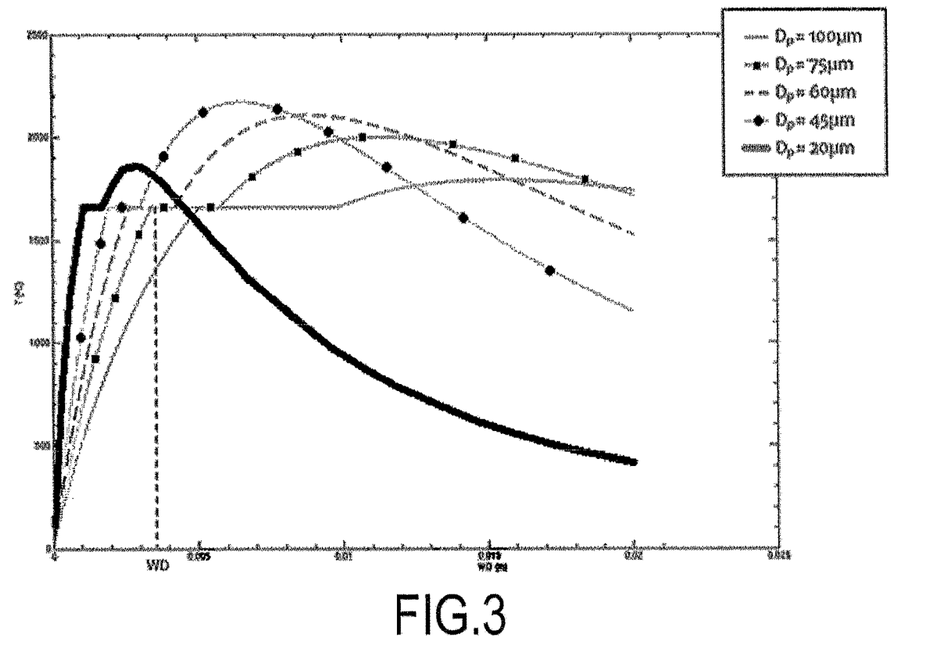
FIG. 3, described above, shows the effect of the diameter $D_P$ of the particles of Ti-6Al-4V powder on their temperature at the outlet from the nozzle when they reach the liquid pool.

Over the working distance WD under consideration, the powder may likewise not be melted by the laser beam 95 or it may melt in part only because the sizes of some or all of the particles making up the powder are too great for them to be melted. As can be seen in FIG. 3, the smaller the mean diameter $D_F$ of the powder particles, the greater the speed with which they heat up, but the shorter the time they are maintained at the melting temperature and the faster their cooling. Furthermore, FIG. 3 shows that the narrower the distribution of sizes, the greater the extent to which all of the particles of the powder are molten when they reach the pool for a given working configuration.

Under all circumstances, the powder particles are heated by passing through the laser beam 95 prior to feeding the pool.

While the laser beam 95 (or the support 80) moves downstream, the pool 102 is maintained and solidifies progressively to form a fillet of solidified material 105 on the support 80. The process is continued so as to form another solidified fillet on the support 80, this other fillet being juxtaposed with the first fillet, for example. Thus, by moving the nozzle 190 or the support 80 in a plane parallel to the above-mentioned working plane P, a first layer 10 of material is deposited on the support 80, which layer forms by solidifying a first element 15 in a single piece of shape that complies with the shape defined in the CADM file.

Thereafter, the nozzle 190 and the laser beam 95 are caused to perform a second scan together so as to form in similar manner a second layer 20 of material on top of the first element 15. This second layer 20 forms a second consolidated element 25, and together these two elements 15 and 25 form a single-piece block. The pools 102 formed on the first element 15 during building of the second layer 20 generally comprise at least a portion of the first element 15 that has melted by being exposed to the laser beam 95, together with the particles of the powder feeding the pools 102.

Consideration is given to a reference frame constituted by the vertical axis $Z_0$ perpendicular to the top surface $S_0$ of the support, and by the surface $S_0$ of the support. This reference frame is tied to the support 80, or more exactly to the part being built for which the reference plane P is defined by the surface $S_0$ of the support while depositing the first layer of material, or by the top surface of the most recently deposited layer.

For a layer in general, the working plane P is not necessarily parallel to the surface $S_0$. The axis Z defined as being perpendicular to the working plane P is thus not necessarily parallel to the axis $Z_0$.

Figure 4:
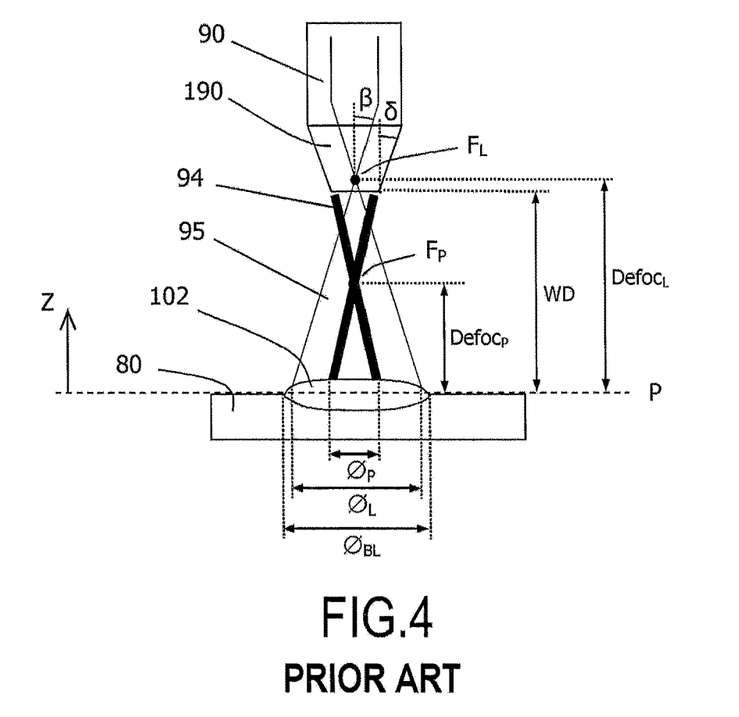
FIG. 4, described above, is a diagram showing the positioning of the high energy beam and of the powder beam in the prior art method.
Figure 5:
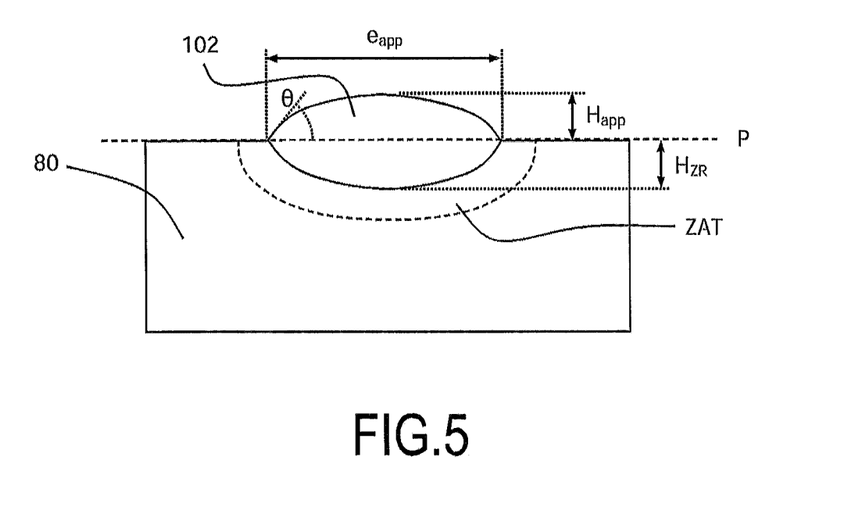
FIG. 5, described above, is a diagrammatic cross-section of the liquid pool formed in the support.

Between two successive layers, the nozzle moves along the axis Z by a value ΔZ that is theoretically equal to the height of material $H_{app}$ that has actually been deposited and that should be constant (independently of the path of the nozzle) and that is sufficiently large when building is optimized and stable (FIGS. 4 and 5). FIG. 5 is a cross-section of the liquid pool formed in part in the support, and it shows the shape of the pool.

The surface $S_0$ of the support 80 is the plane at height zero. Thus, while building the first layer, a plane parallel to $S_0$ and having a portion contained in the support or below the support (relative to the axis $Z_0$) is at negative height, and a plane parallel to $S_0$ with a portion above the surface $S_0$ of the support (relative to the axis $Z_0$) is at positive height.

A given working plane P relating to building an $[n]^{th}$ layer is above another working plane attached to a lower layer if it has a height that is positive, greater than the height of that other plane.

In this reference frame tied to the support 80 and to the part, the second layer 20 is constructed on a working plane P that is situated above the working plane of the first layer 10, these two planes being spaced apart by a distance ΔZ measured along the axis Z perpendicular to the working plane P.

In general, the working plane of a higher layer need not be parallel to the working plane of the preceding lower layer, in which the axis Z of the higher layer is at a non-zero angle relative to the axis Z of the working plane of the lower layer, and the distance ΔZ measured along the latter axis Z above each point of the lower layer is a mean value.

This process of preparing the part layer by layer is then continued by adding additional layers over the assembly that has already been formed.

FIG. 4, which shows the prior art, shows in greater detail the configuration of the laser beam 95 and of the powder beam 94. The laser beam 95 leaves the nozzle 190 diverging at an angle 2β from its focal point $F_L$ (situated in the bottom portion of the nozzle 190) and it illuminates a region of the support 80, contributing to creating a pool 102 therein.

The powder beam 94 leaves the nozzle 190 while converging at an angle 2δ towards its focal point $F_P$, which lies inside the laser beam 95 and immediately over (or above) the surface of the support 80 (working plane P), in such a manner that the powder particles 60 spend a maximum length of time in the laser beam 95 in order to be heated. The advantage of a large amount of interaction between the laser and the powder upstream from the pool is to generate both a high deposition rate and low dilution as are frequently desired when building up the surfaces of worn parts in order to repair them and when depositing hard coatings.

The theoretical efficiency of melting is defined as being the ratio of the diameter $Ø_L$ of the laser beam 95 divided by the diameter $Ø_P$ of the powder beam 94, these two diameters being determined in the working plane P.

Alternatively, diameter $Ø_L$ may be replaced by the diameter of the liquid pool $Ø_{BL}$ (see FIG. 4) in order to evaluate the efficiency, which depends amongst other things on the selected parameter settings, in particular the laser power $P_L$, the scanning speed of the laser beam V, and the mass flow rate $D_m$ of powder.

The laser diameter at its focal point (i.e. $Ø_{L0}$) is often much smaller than the diameter $Ø_{P0}$ of the powder beam at the powder focal point so the working configuration in the prior art logically requires the laser beam to be unfocused (its focal point $F_L$ lies above the working plane P) for a powder beam that is focused (its focal point $F_P$ is situated on the working plane P), or a powder beam that is unfocused with its focal point $F_P$ lying above the working plane P and below the laser focal point $F_L$, since otherwise the structure being built will be unstable and there is no guarantee of acceptable melting efficiency. As mentioned above, in general, the laser beam diameter $Ø_L$ measured in the plane P does not correspond to the liquid pool diameter $Ø_{BL}$ which is approximately equal to the width (written $e_{app}$) of the fillet after solidification (FIGS. 4 and 5).

This diameter $Ø_{BL}$ of the liquid pool is assumed to be a function of $Ø_L$ and thus of $Ø_{L0}$ and also of the settings defined by the triplet ($P_L$, V, $D_m$) and also the size $D_P$ of the various powder particles and their speeds $V_p$, in addition to depending on their thermo-physical properties.

During the process of building the part layer by layer, the nozzle 190 moves in particular vertically, and while keeping constant the distance between the points $F_L$ and $F_P$ (i.e. $Defoc_L$-$Defoc_P$=constant) where $Defoc_L$ and $Defoc_P$ represent respectively the laser defocus and the powder defocus defined as follows:

$Defoc_L$={distance from $F_L$ to the working plane P} and
$Defoc_P$={distance from $F_P$ to the working plane P} as can be seen in FIG. 4.

Thus, the focal point $F_P$ of the powder beam 94 remains inside the laser beam 95 and immediately over (or above) the surface of the previously constructed layer (working plane P).

There is thus a defocused laser beam ($Defoc_L$>0) and a defocused powder beam ($Defoc_P$=0) on the plane P or defocused ($Defoc_P$>0) above the plane P, and the two angles 2β and 2δ need to be configured in such a manner that firstly the working distance WD between the outlet from the nozzle and the plane P is large enough to avoid damaging the bottom of the nozzle by radiation from the pool, and secondly to ensure that the aperture of the laser beam at the outlet from the nozzle remains less than the diameter of the inside cone.

Moving the support 80 or scanning the assembly comprising the nozzle 190 and the laser beam 95 makes it possible to give each layer a shape that is independent of the adjacent layers. The lower layers of the part are annealed and they cool progressively as the higher layers of the part are formed.

Nevertheless, there exists a need to improve the melting mass efficiency $R_m$ (i.e. the ratio of the quantity of material forming the finished part to the quantity of material that is projected by the nozzle in order to form the part), the recycled powder mass efficiency $\zeta_{recy}$ (i.e. the ratio of the quantity of morphologically intact powder and agglomerates, e.g. as obtained after screening, to the quantity of material that is projected), the stability of the pool formed at the surface of the part, and the material soundness of the fabricated part, for a given non-exhaustive set of parameter settings (size distribution $D_P$ for the powder particles, nature of the powder material, powder mass flow rate $D_m$, travel speed V of the assembly comprising the nozzle and the laser beam, power $P_L$ supplied by the laser, distribution of power density on the working plane P, type of laser source (solid or gas), mode (pulsed or continuous), coaxial nozzle, nature of the gas carrying the powder particles and its flow rate $D_{gp}$, nature of the protective gas crossing the axis of the nozzle and its flow rate $D_{g1}$, the angles $2\beta$ and $2\delta$, and also the above-defined diameters $\emptyset_{L0}$ and $\emptyset_{P0}$, etc.).

The invention seeks to propose a method and more particularly a working configuration that are optimized (defined by: $Defoc_L$, $Defoc_P$, WD) for the DMD method serving firstly to improve the stability of the pool and secondly to improve the melting mass efficiency, the recycled powder mass efficiency, the material soundness, and the building speed (maximizing the Z rise increment of the nozzle, written $\Delta Z$).

This object is achieved by the fact that the powder particles reach each pool at a temperature that is cold relative to the temperature of the pool.

By means of these provisions, the mass efficiency $\eta_p$ of the method defined as the sum of the melting mass efficiency ($R_m$) plus the recycled powder efficiency ($\zeta_{recy}$) is greater than the mass efficiency of the method when the powder particles reach the pool hot or even partially or totally melted. In addition, on reaching the pool, the powder particles serve to reduce the temperature of the liquid pool $T_{BL}$ (because they are much colder than the pool, the particles being substantially at ambient temperature prior to penetrating into the pool), while increasing the volume of the pool and in particular its volume above the plane P without increasing the width and the height of the diluted zone (volume of the pool that lies below the plane P). This leads inevitably to a rapid increase in the surface tension between the liquid surface and the vapor of the pool, and consequently gives rise to better stability of the pool.

Furthermore, encouraging a large amount of dilution in this way in each deposited layer serves to minimize fabrication defects.

Advantageously, the high energy beam focal point $F_L$ is situated above the working plane P or in this plane, and the powder beam focal point $F_P$ is situated below the working plane P, such that the powder particles do not at any time cross the high energy beam between the outlet from the nozzle and the working plane P. In particular, the powder beam focal point $F_P$ may be situated within the support, in particular when depositing the initial layers. After a certain number of layers have been deposited, the powder beam focal point $F_P$ may be situated within previously deposited layers.

Thus, the majority of powder particles are cold when they reach the pool previously formed on the already-built portion of the part.

These particles then penetrate into a pool that is wide enough ($\emptyset_{BL} > \emptyset_P$) and deep enough ($H_{ZR} > H_{app}$: see definitions above given with reference to FIG. 5) to ingest a maximum quantity and a maximum fraction of all of the particles projected by the nozzle during the laser/pool interaction time, as defined by the ratio of $\emptyset_L$ over V.

Furthermore, since the remaining powder particles are intact, unheated by the high energy beam, they are entirely suitable for recycling.

Furthermore, the power beam and the high energy beam may be substantially coaxial, i.e. their axes may form between them an angle of less than 30°, preferably less than 20°, more preferably less than 10°, still more preferably less than 5°. The high energy beam can thus easily follow the powder beam during fabrication of parts that are complex in shape. It is much more difficult to track the shape of the part for fabricating when projection or melting is offset, i.e. when the powder beam and the high energy beam are not substantially coaxial.

The invention can be well understood and its advantages appear better on reading the following detailed description of an implementation given by way of non-limiting example. The description refers to the accompanying drawings, in which.

In the invention, the powder particles are cold when they reach the pool formed at the surface of the preceding layer (or of the support). The term "cold" means that the temperature of the particles is much lower than the temperature of the pool. Prior to penetrating into the pool, the temperature of the particles is substantially equal to ambient temperature, e.g. being about 20° C.

In comparison, the temperature of the liquid pool $T_{BL}$ is higher than the melting temperature $T_F$ of the material constituting the powder, but lower than the boiling temperature $T_{evap}$ of that material. This melting temperature is higher than 550° C. for aluminum alloys, higher than 1300° C. for nickel-based alloys, higher than 1450° C. for steels, and higher than 1550° C. for titanium alloys.

Figure 1:
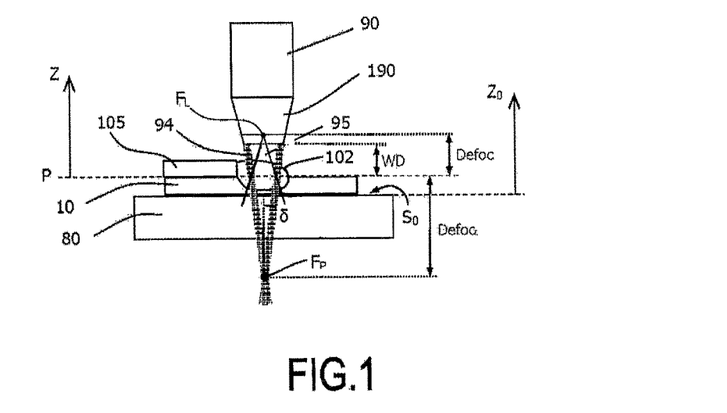
FIG. 1 is a diagram showing one possibility for positioning the high energy beam and the powder beam in the method of the invention.

FIG. 1 shows an implementation of the invention that enables powder particles to be cold when they reach the pool formed in the surface of the preceding layer (or of the support). Such an implementation also presents the advantage of making it easier to view the pool on the axis e.g. by means of a charge-coupled device (CCD) camera so as to monitor the method on line, which is useful for industrializing the method.

FIG. 1 is a section view of a support 80 together with a first layer 10 of material that has already been deposited on the support 80. A second layer 20 is then deposited on the first layer 10. A fillet 105 of the second layer 20 is shown while it is being built, with the fillet 105 advancing from left to right, and from upstream to downstream (the forward travel direction of the fillet 105, or in equivalent manner of the liquid pool 102). The pool 102 is thus situated immediately downstream from the fillet 105 under the nozzle 190 from which there emerge the laser beam 95 and the powder beam 94. The top surface of the first layer 10 then constitutes the working plane P relative to the second layer that is being built and from which the following are measured: the laser defocus distance $Defoc_L$, the powder defocus distance $Defoc_P$, the working distance WD, the diameter $\emptyset_L$ of the laser beam, and the diameter $\emptyset_P$ of the powder beam.

Simultaneously with projecting powder particles 60, the nozzle 190 emits a laser beam 95 coming from a generator 90. The first orifice 191 of the nozzle 190 through which the powder is projected onto the support 80 is coaxial with the second orifice 192 through which the laser beam 95 is emitted, such that the powder is projected in the laser beam 95. The powder forms a cone of particles, this hollow cone presenting a certain thickness (powder beam 94), and the laser beam is conical.

In the invention, the nozzle 190 is configured and positioned in such a manner that the focal point $F_L$ of the high energy beam 95 is situated above the working plane P or in that plane, and the focal point $F_P$ of the powder beam 94 is situated beneath the working plane P, such that the powder particles 60 do not at any time cross the high energy beam between the outlet from the nozzle and the working plane P.

In an implementation other than that shown in FIG. 1, the focal point $F_P$ of the powder beam may lie within the support. Under such circumstances, the powder defocus distance $Defoc_P$ is smaller than that shown in FIG. 1. As a result, the diameter $\emptyset_L$ of the laser beam in the plane P is closer to the diameter $\emptyset_P$ of the powder beam in the plane P, for given parameter settings ($F_L$, V, $D_m$).

By way of example, the diameter $\emptyset_L$ of the laser beam in the plane P is slightly less than the diameter $\emptyset_P$ of the powder beam in the plane P.

As shown in FIG. 1, such a configuration is obtained by moving the nozzle 190 closer to the working plane P relative to the prior art configuration (FIG. 4), i.e. by reducing the working distance WD.

Such a working configuration is particularly adapted to making wide fillets 105, i.e. fillets 105 of width that is greater than the diameter $\emptyset_{L0}$ of the high energy beam 95 at the laser focal point.

The diameter of the liquid pool $\emptyset_{BL}$ is then greater and more cold powder particles reach the liquid pool 102, which is beneficial as explained above.

The focal point $F_L$ of the high energy beam (95) may alternatively be situated in the working plane P, which is preferable when making fine fillets of smaller width. Under such circumstances, the focal point $F_P$ of the powder beam 94 may be situated in the working plane P. The focal point $F_P$ of the powder beam 94 may also be situated below the working plane P.

In order to optimize the method of the invention, it is possible to adapt certain parameter settings accordingly, in particular the laser power $P_L$, the scanning speed V, and/or the powder mass flow rate $D_m$.

Nevertheless, in the implementation shown in FIG. 1, it may be necessary to provide (additional) cooling of the nozzle 190 since the nozzle 190 is heated by radiation due to its proximity to the liquid pool 102. Such cooling requires a device that is expensive.

In order to mitigate this problem and thus conserve a working distance WD (distance of the nozzle from the pool) that is sufficient, while avoiding the powder beam crossing the high energy beam, the inventors have devised an implementation that consists advantageously either in reducing the distance $Defoc_L$, or in reducing the divergence half-angle β of the laser beam 95 relative to the axis Z, which amounts either way to reducing $\emptyset_L$ so as to ensure that it is smaller than $\emptyset_P$.

Alternatively, the distance $Defoc_P$ of the powder beam 94 is increased in order to compensate for the reduction in $\emptyset_P$ when increasing WD, thereby keeping $\emptyset_P$ greater than $\emptyset_L$.

This reduction in the distance $Defoc_L$ and in the angle β, and this increase in the distance $Defoc_P$ may be performed jointly.

These variations in these three variables may be performed independently or in addition to increasing the working distance WD. In practice, the nozzle 190 is thus configured and positioned in such a manner that the powder particles 60 reach the working plane P immediately outside the zone of the working plane P that is covered by the laser beam 95.

Thus, given that the liquid pool 102 extends by conduction a little beyond that zone, the majority of the powder particles 60 drop into the pool 102 without interacting with the laser beam 95. The powder particles 60 are thus still cold before they penetrate into the pool 102. An advantage of this absence of interaction between the laser and the powder upstream from the pool 102 is to avoid any change of shape, to avoid agglomerates forming, and to avoid harmful oxidation of the powder particles 60.

This explains why tests undertaken by the inventors show that the melting mass efficiency $R_m$ in the method of the invention is higher than the melting mass efficiency when the powders reach the pool while hot, or indeed while partially or completely melted.

Furthermore, the pool 102 is thermally more stable since the powder particles 60 cool the pool 102 quickly (thereby increasing the surface tension between the liquid and the vapor of the pool, and very certainly leading to changes in convection movements within the pool as a result of variation in the density of the liquid by adding "cold" powders and by changing the temperature gradient within the pool).

An additional advantage of the method of the invention is that the powder particles 60 that have not participated in forming the liquid pool (since they drop outside the pool 102) remain cold and are thus almost all suitable for recycling. The total mass efficiency of the (melting+recycling) method of the invention is thus indeed greater than the total mass efficiency of the prior art method.

Advantageously, for greater stability of the pool 102 and for better material soundness once a steady temperature regime has been established locally around the pool in the part being built, the pool has an oblong shape defined by θ<90°, $H_{app}/e_{app}$<1, and $H_{ZR}/H_{app}$≥0.6, where θ is the angle made by the top surface of the pool 102 with the working plane P, $H_{app}$ is the apparent height of the fillet (portion of the bath 102 above the working plane P), $e_{app}$ is its width, and $H_{ZR}$ is the height of the remelted zone or diluted zone (portion of the pool below the working plane P) (see FIG. 5).

Preferably, the three quantities θ, $H_{app}/e_{app}$, and $H_{ZR}/H_{app}$ satisfy the following relationships:

$$15°≤θ≤60°, 0.04≤H_{app}/e_{app}≤0.75, \text{ and } 1≤H_{ZR}/H_{app}≤6.$$

When material is being built up on a part for repair purposes, these quantities preferably satisfy the following relationships:

$$30°≤θ≤60°, 0.151≤H_{app}/e_{app}≤0.25, \text{ and } 0.01≤H_{ZR}/H_{app}≤0.025.$$

Advantageously, the size distribution of powder particles 60 is narrow (which corresponds to particles all having substantially the same size, which size is appropriate for the temperature and the volume of the liquid pool so as to be molten at all times throughout the duration of laser/pool interaction). Under such circumstances, the probability is high that all of the powder particles 60 have sufficient time to melt in the pool 102 before the laser beam 95 has moved on (and thus ceased to heat the pool 102). The method consisting in feeding the pool with powder particles that are cold and that have a size distribution that is narrow is then more effective in terms of stability and build speed since the temperature of the pool decreases more quickly and the apparent height of the fillet becomes greater. This apparent height increases with finer particles since the temperature of the pool decreases progressively and remains constant (solidification threshold reached) as the particles penetrate into the pool 102.

For example, the powder particles 60 present sizes lying in the range 25 micrometers (μm) to 75 μm. Preferably, these sizes lie in the range 25 μm to 45 μm.

In the prior art method, a wider distribution of powder particles 60 is more harmful. In the presence of interaction between the laser and the powder, powder particles 60 of different sizes reaching the pool at different temperatures leads to the temperature of the pool fluctuating, and runs the risk of making the pool unstable.

Advantageously, the positioning of the nozzle 190, i.e. the working distance WD, is servo-controlled to spatial variations of the working plane P (variations in the consolidated material height $H_{app}$ of a layer of the part to be built, while the raising increment ΔZ up the Z axis of the nozzle 190 is kept constant by preprogramming) such that, for each layer, the focal point $F_L$ of the laser beam 95 is situated at the same height above the working plane P, and the focal point $F_P$ of the powder beam 94 is situated at the same height below the working plane P.

Alternatively, the increment ΔZ may be servo-controlled to the variations in the consolidated material height $H_{app}$ of a layer.

Such servo-control is performed by using a process control program of known type, that does not need to be described herein.

The invention claimed is:

1. A method of fabricating a part having a shape, the method comprising:
   a) supplying a material in the form of powder particles forming a powder beam;
   b) heating a first quantity of said powder to a temperature higher than a melting temperature of the powder with the help of a high energy beam, and forming, at a surface of a support, a first pool comprising the melted powder and a portion of the support;
   c) heating a second quantity of said powder to a temperature higher than the melting temperature with the help of said high energy beam, and forming, at the surface of the support, a second pool comprising the melted powder and a portion of the support downstream from the first pool;
   d) repeating step c) until a first layer of said part is formed on said support;
   e) heating an $[n]^{th}$ quantity of said powder to a temperature higher than the melting temperature with the help of a high energy beam, and forming an $[n]^{th}$ pool comprising in part the melted powder above a portion of said first layer;
   f) heating an $[n+1]^{th}$ quantity of said powder to a temperature higher than the melting temperature with the help of said high energy beam, and forming an $[n+1]^{th}$ pool comprising in part the melted powder downstream from said $[n]^{th}$ pool above a portion of said first layer;
   g) repeating step f) so as to form a second layer of said part above said first layer; and
   h) repeating steps e) to g) for each layer situated above an already-formed layer until the shape for said part has been reconstituted;
   wherein the powder beam and the high energy beam are substantially coaxial during steps b) through h) to form each layer so that an angle between an axis of the powder beam and an axis of the high energy beam is equal to or less than 20° and wherein the powder particles reach each of the pools during steps b) through h) at a temperature that is cold relative to the temperature of said pool, and
   wherein each of said pools has a shape defined by θ<90°, $H_{app}/e_{app}<1$, and $H_{ZR}/H_{app} \geq 0.6$, where θ designates the angle between a top surface of said pool and a working plane, $H_{app}$ designates an apparent height of a fillet that corresponds to the portion of the pool above the working plane, $e_{app}$ designates a width of the fillet, and $H_{ZR}$ designates a height of a remelted zone, the working plane being defined as the plane containing the surface on which said layers are being formed.

2. The method of fabricating a part according to claim 1, wherein the powder particles have a size lying in a range from 25 μm to 75 μm.

3. The method of fabricating a part according to claim 2, wherein the powder particles have a size lying in a range from 25 μm to 45 μm.

4. The method of fabricating a part according to claim 1, wherein a focal point of the high energy beam is situated above a working plane or in said working plane, and a focal point of the powder beam is situated beneath the working plane, such that powder particles do not at any time cross the high energy beam between an outlet of a nozzle and the working plane, the working plane being defined as the plane containing the surface on which said layers are being formed.

5. The method of fabricating a part according to claim 4, wherein in order to obtain the focal point of the high energy beam and the focal point of the powder beam, a defocus distance of the powder beam is increased, or a divergence half-angle of the high energy beam relative to a perpendicular to said working plane is decreased, or both the defocus distance of the powder beam is increased and the divergence half-angle of the high energy beam relative to a perpendicular to said working plane is decreased, or a defocus distance of the high energy beam is decreased.

6. The method of fabricating a part according to claim 1, wherein the three quantities θ, $H_{app}/e_{app}$, and $H_{ZR}/H_{app}$ satisfy the following relationships:

$$15° \leq \theta \leq 60°, \ 0.04 \leq H_{app}/e_{app} \leq 0.75, \text{ and } 1 \leq H_{ZR}/H_{app} \leq 6.$$

7. The method of fabricating a part according to claim 1, wherein the powder particles are at ambient temperature when reaching the pool.

8. The method of fabricating a part according to claim 7, wherein the ambient temperature is 20° C.

9. The method of fabricating a part according to claim 1, wherein the powder particles all have the same size.

10. The method of fabricating a part according to claim 1, wherein the angle between the axis of the powder beam and the axis of the high energy beam is equal to or less than 10°.

11. The method of fabricating a part according to claim 10, wherein the angle between the axis of the powder beam and the axis of the high energy beam is equal to or less than 5°.

12. The method of fabricating a part according to claim 1, wherein the powder particles have a size distribution that is in a range from 25 μm to 75 μm.

* * * * *